No. 700,568. Patented May 20, 1902.
M. SCHWARTZ.
CHIMNEY COWL OR VENTILATOR.
(Application filed Dec. 19, 1901.)
(No Model.) 2 Sheets—Sheet 1.

WITNESSES:
Walter Woelhein
B. Bradway.

INVENTOR
Mendel Schwartz
BY
Loewel Wahle
ATTORNEYS

THE NORRIS PETERS CO., PHOTO-LITHO., WASHINGTON, D. C.

No. 700,568. Patented May 20, 1902.
M. SCHWARTZ.
CHIMNEY COWL OR VENTILATOR.
(Application filed Dec. 19, 1901.)
(No Model.) 2 Sheets—Sheet 2.
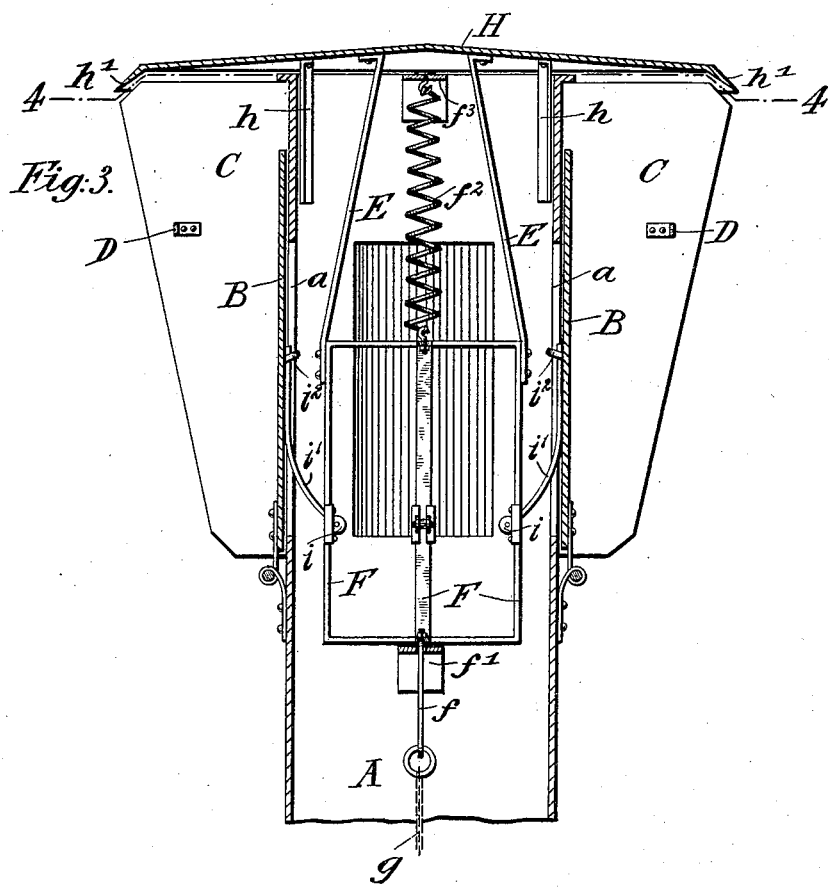
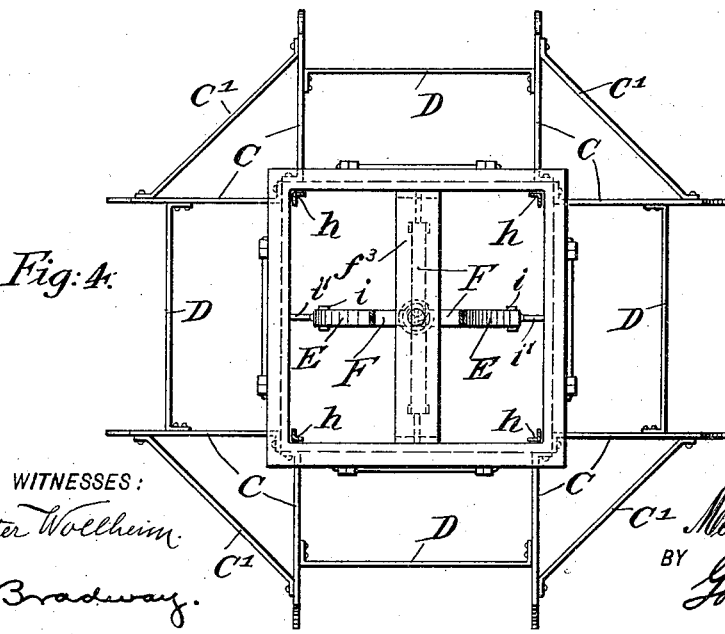

UNITED STATES PATENT OFFICE.

MENDEL SCHWARTZ, OF NEW YORK, N. Y.

CHIMNEY COWL OR VENTILATOR.

SPECIFICATION forming part of Letters Patent No. 700,568, dated May 20, 1902.

Application filed December 19, 1901. Serial No. 86,501. (No model.)

*To all whom it may concern:*

Be it known that I, MENDEL SCHWARTZ, a citizen of the Kingdom of Roumania, residing in New York, borough of Manhattan, and State of New York, have invented certain new and useful Improvements in Chimney-Cowls, of which the following is a specification.

This invention relates to improvements in chimney-cowls of that class in which the openings are provided with valves that are adapted to be closed by the force of the wind acting upon them and in which the suction in the trunk of the cowl exerted by the wind causes a draft through the openings in the sides of the cowl not directly acted upon by the wind, so that the cowl functions effectively whatever the direction of the wind and facilitates thereby the ventilation of the chimney, air-duct, or other structure to be ventilated.

The invention consists of a chimney-cowl, which comprises a main trunk provided with openings in its side walls, hinged valves adapted for opening or closing said openings, side wing extensions at the corners of the trunk of the cowl, brace-stops on said wings for supporting the valves in open position, curved rods guided in keepers on the valves, and a vertical guide-frame to which said rods are pivoted, so as to permit the opening or closing of the valves by the raising or lowering of the guide-frame; and the invention consists, further, of a chimney-cowl provided with a hood in the main trunk of the cowl, a vertically-guided and spring-suspended frame supporting said hood, means for lowering or raising said guide-frame and hood, so as to open or close the upper end of the main trunk; and the invention consists, lastly, of certain details of construction and additional features, which will be fully described hereinafter and finally pointed out in the claims.

Figure 1:
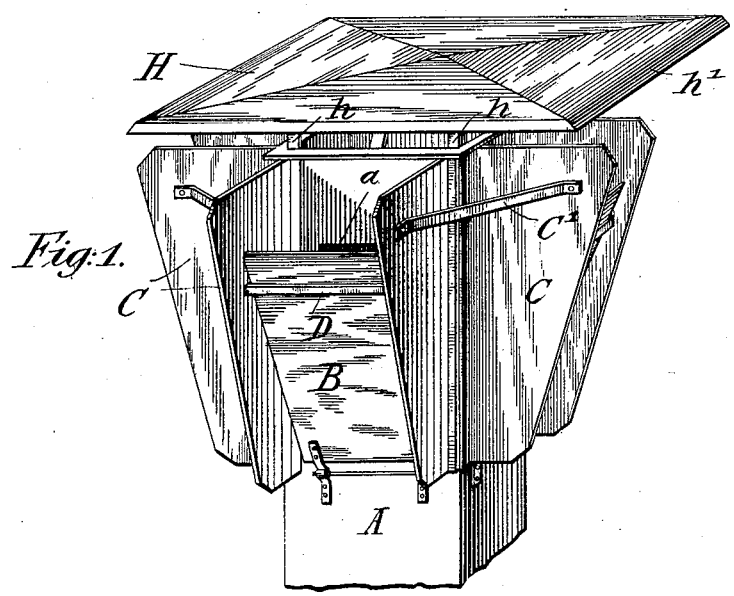
Figure 2:
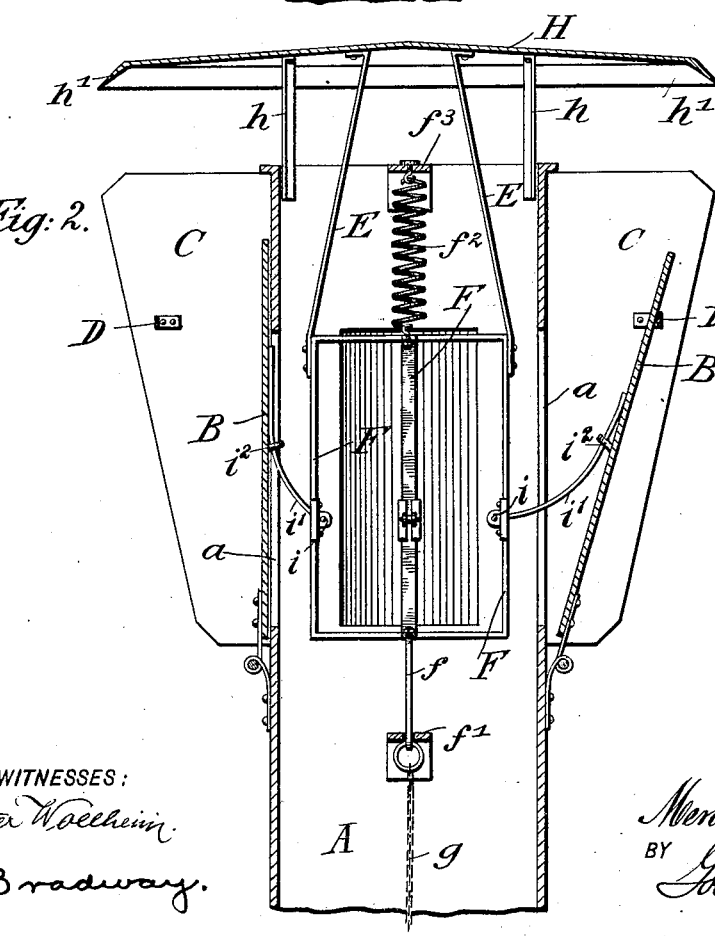

In the accompanying drawings, Figure 1 represents a perspective view of my improved chimney-cowl. Fig. 2 is a vertical central section thereof. Fig. 3 is a similar section, showing the valves and hood in closed position, so as to interrupt the ventilating action of the cowl; and Fig. 4 is a plan view, partly in horizontal section, on line 4 4, Fig. 3.

Similar letters of reference indicate corresponding parts.

Referring to the drawings, A represents the tubular trunk of my improved chimney-cowl. This trunk is made of square, oblong, or other cross-section and provided with openings $a$ in its side walls at a suitable distance from the upper end of the trunk, as shown in Figs. 2 and 3. The openings $a$ are closed by means of valves B, which are hinged at their lower ends to the outside of the walls of the trunk A, said valves being preferably made of suitable sheet metal, like the trunk, and of sufficient size to cover the openings $a$. The main trunk A is provided at its corners with stationary wings C, that are arranged as extensions of the side walls of the trunk, said wings being preferably tapering from the upper toward the lower ends, so as to impart a better appearance to the cowl. The inner edges of the wings C are riveted to the side walls of the trunk A, and the upper ends of two adjacent wings C are connected by angle-braces C', and the parallel wings are connected by transverse braces D, which are bent at right angles at their ends and riveted or otherwise fastened to the wings, as shown in Figs. 1 and 4, said transverse braces D serving also as rests for the valves B when they are in their normally open position, as shown in Fig. 1. Above the cowl is supported a cap or hood H, which is guided by angle-irons $h$, arranged to move in the corners of the upper end of the trunk A, said hood being provided with a downwardly-inclined or dishing flange $h'$, that fits over the corresponding beveled-off ends of the wings C' when the hood is lowered on the same. The hood H is supported by means of straps E, secured rigidly to the central part of the hood at their ends and to a guide-frame F at their lower ends, and which latter is preferably made of two rectangular sections that cross each other centrally at right angles and are guided at their lower ends by a center rod $f$, adapted to move in a hole of the transverse strap $f'$, that is supported between the two opposite side walls of the trunk A, as shown in Fig. 2. The upper end of the guide-frame F is connected by the helical spring $f^2$ with the transverse strap or brace $f^3$, which is attached to two opposite side walls of the trunk at the upper edges thereof. The spring $f^2$ serves for suspending the guide-frame that supports the hood, and it has to be of sufficient strength to maintain the same in normally raised position, as shown in Figs. 1 and 2. On the sides of the guide-frame F are mounted lugs $i$ for pivotally securing the pivot-straps $i'$, that move in the keepers $i^2$, attached to the inner ends of the valves B, and are of such length as to be permanently retained in said keepers, so as to prevent their becoming disengaged.

When it is desired to lower the hood H, so as to close the cowl, the chain $g$ is pulled in downward direction and fastened to a suitable point. In this operation the guide-frame is moved in downward direction until it is seated on the transverse strap $f'$, in which position the hood H fits tightly on the upper end of the trunk and the upper ends of the wings C, as shown clearly in Fig. 3. Simultaneously the valves B close the openings $a$ by means of the straps pivoted to the guide-frame F, so as to prevent thereby any ventilation from or ingress of wind into the trunk of the cowl. The hood and valves are secured firmly in closed position during stormy weather or whenever it is desired to shut out the outer air from entering the chimney, and thus interrupt the ventilating action of the cowl. When the cowl, however, is desired to be used for ventilating the chimney or other structure to which it is applied, the chain $g$ is released, so that the guide-frame, with the hood, is returned under action of the spring into its normal position, as shown in Fig. 2. Simultaneously therewith the valves are moved into their outwardly-inclined position and rest on the transverse brace-rods of the wings. When the parts of the cowl are in this position, the wind passing through in the space between the upper end of the hood and the top of the cowl produces a sucking action in the trunk, so as to permit an egress from the side walls of the trunk and produce thereby a sucking action in the chimney or rooms to be ventilated. When the wind is of sufficient force to close the valve on that side of the cowl which is in the direction of the wind, the air is allowed to pass out through the remaining openings in the cowl which are in the off side from the direction of the wind. In this manner by the free motion of the hinged valves a current of wind will produce a suction through the openings that remain unclosed in addition to the suction of the wind that passes through the space between the upper end of the trunk and the hood, so that the effective ventilating or sucking action of the cowl on the space to be ventilated is carried on in a reliable manner.

Having thus described my invention, I claim as new and desire to secure by Letters Patent—

1. In a chimney-cowl, the combination, with a main trunk having openings in its side walls and side extension-wings, of a vertically-adjustable hood guided over said main trunk and side extension-wings, valves for closing said openings, and means for operating simultaneously said valves with the adjustment of said hood, substantially as set forth.

2. In a chimney-cowl, the combination, with a main trunk having openings in its side walls and side extension-wings, of a vertically-adjustable hood guided over said main trunk and side extension-wings, valves hinged at their bottom edges to the side walls of said main trunk, a spring-suspended means guided in said main trunk and supporting said hood, and means connected therewith for operating said valves simultaneously with the adjusting of said hood, substantially as set forth.

3. The combination, with a main trunk provided with openings in its side walls, of side extension-wings at the corners of the trunk, valves hinged to the side walls of said trunk and adapted to close the side openings in the trunk, a hood supported above the trunk, a spring-suspended guide-frame in said trunk connected with said hood, pivot-straps connecting the guide-frame with the valves, and a chain connected with the guide-frame for lowering the guide-frame and hood and closing the valves, substantially as set forth.

In testimony that I claim the foregoing as my invention I have signed my name in presence of two subscribing witnesses.

MENDEL SCHWARTZ.

Witnesses:
PAUL GOEPEL,
C. BRADWAY.